(12) United States Patent
Soldati et al.

(10) Patent No.: US 10,070,306 B2
(45) Date of Patent: Sep. 4, 2018

(54) NETWORK NODE, USER DEVICE AND METHODS THEREOF

(71) Applicant: Huawei Technologies Co., Ltd., Shenzhen (CN)

(72) Inventors: Pablo Soldati, Kista (SE); Alberto Giuseppe Perotti, Segrate (IT); Yinggang Du, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/811,189

(22) Filed: Nov. 13, 2017

(65) Prior Publication Data

US 2018/0070225 A1    Mar. 8, 2018

Related U.S. Application Data

(63) Continuation of application No. PCT/EP2015/068580, filed on Aug. 12, 2015.

(30) Foreign Application Priority Data

May 13, 2015 (EP) ..................................... 15167576

(51) Int. Cl.
*H04W 8/22* (2009.01)
*H04W 4/08* (2009.01)
(Continued)

(52) U.S. Cl.
CPC ............... *H04W 8/22* (2013.01); *H04W 4/08* (2013.01); *H04W 24/10* (2013.01); *H04W 8/005* (2013.01)

(58) Field of Classification Search
CPC ......... H04W 8/26; H04W 8/22; H04W 24/10; H04W 4/08; H04W 8/005
See application file for complete search history.

(56) References Cited

U.S. PATENT DOCUMENTS

2013/0040619 A1* 2/2013 Grube ..................... H04W 8/22
455/414.1
2017/0127272 A1* 5/2017 Kela ....................... H04W 8/26
(Continued)

OTHER PUBLICATIONS

"Candidate schemes for superposition transmission," 3GPP TSG RAN WG1#80b, Belgrade, Serbia R1-151848,3rd Generation Partnership Project, Valbonne, France (Apr. 20-24, 2015).
(Continued)

*Primary Examiner* — Chuong A Ngo
(74) *Attorney, Agent, or Firm* — Leydig, Voit & Mayer, Ltd.

(57) ABSTRACT

The embodiments of the present invention relates to a network node and a user device. The network node comprising: a processor configured to: generate a check element for each user device in a group of user devices; a transmitter configured to: transmit the control information message to the group of user devices. The user device comprising: a receiver configured to: receive a control information message addressed for a group of user devices; a processor configured to: perform a redundancy check on the control information message; derive the control information from the control information message and discard check elements of other user devices upon a positive redundancy check; communicate in the wireless communication system based on the derived control information. Furthermore, the present invention also relates to corresponding methods, a computer program, and a computer program product.

19 Claims, 8 Drawing Sheets

(51) Int. Cl.
*H04W 24/10* (2009.01)
*H04W 8/00* (2009.01)

(56) References Cited

U.S. PATENT DOCUMENTS

2017/0251343 A1* 8/2017 Robbins .................. H04W 4/08
2017/0339534 A1* 11/2017 Bhalla .................... H04W 4/08

OTHER PUBLICATIONS

"Discussion on downlink control channel for multiuser superposition transmission," 3GPP TSG RAN WG1 Meeting #80b, Belgrade, Serbia, R1-151974, 3rd Generation Partnership Project, Valbonne, France (Apr. 20-24, 2015).

"Method to identify L1/L2 control signalling formats for scheduling," 3GPP TSG-RAN WG2#56-bis, Sorrento Italy, R2-070233,3rd Generation Partnership Project, Valbonne, France (Jan. 15-19, 2007).

"Discussion on multiuser superposition schemes and signaling schemes," 3GPP TSG RAN WG1 Meeting #82, Beijing, China R1-154282, 3rd Generation Partnership Project, Valbonne, France (Aug. 24-28, 2015).

\* cited by examiner

NETWORK NODE, USER DEVICE AND METHODS THEREOF

CROSS-REFERENCE TO RELATED APPLICATIONS

This application is a continuation of International Application No. PCT/EP2015/068580, filed on Aug. 12, 2015, which claims priority to European Patent Application No. EP15167576.6, filed on May 13, 2015. The disclosures of the aforementioned applications are hereby incorporated by reference in their entireties.

TECHNICAL FIELD

The embodiments of the present invention relate to a network node and a user device. Furthermore, the present invention also relates to corresponding methods, a computer program, and a computer program product.

BACKGROUND

The downlink of the 3GPP Long Term Evolution (LTE) cellular communication system is based on Orthogonal Frequency Division Multiplex (OFDM) transmission, which uses time and frequency resource units for transmission. The smallest time-frequency resource unit, called resource element (RE), consists of a single complex sinusoid frequency (sub-carrier) in an OFDM symbol. For the purpose of scheduling transmissions to the different user equipments (UEs), the resource elements are grouped into larger units called physical resource blocks (PRBs). A PRB occupies a half of a subframe, called "slot", consisting of six or seven consecutive OFDM symbol intervals in time domain (0.5 milliseconds in total), and twelve consecutive sub-carrier frequencies in the frequency domain (180 kHz in total).

Downlink (and uplink) transmissions in LTE occur in an orthogonal manner, i.e., in each downlink (/uplink) subframe users are scheduled to receive (/transmit) in orthogonal radio resources by being granted access to non-overlapping sets of physical resource blocks. The downlink of the 3GPP LTE-A system also supports multi-user multiple-input-multiple-output (MU-MIMO) transmission, where a set of users are orthogonally multiplexed in different antenna spatial layers (corresponding to orthogonal radio channels) while being granted access to the same set of time-frequency resources. In this way, more users can be simultaneously served by the base station. Additional non-orthogonal multiple access schemes for LTE-A are currently being investigated by the 3GPP standardization body.

Downlink (/uplink) transmission grants in the LTE system are assigned to the UEs by means of scheduling grants transmitted in one of the downlink control channels provided by LTE: the Physical Downlink Control Channel (PDCCH) and the Enhanced PDCCH (a.k.a. EPDCCH). The PDCCH is transmitted in a control region that can occupy up to three OFDM symbols at the beginning of each subframe, whereas the remaining part of the subframe forms the data region used for the transmission of the Physical Downlink Shared Channel (PDSCH). EPDCCH, on the other hand, consists of a UE-specific control channel configured via higher layer Radio Resource Control (RRC) signalling within the PDSCH resources (i.e., PRB pairs). A UE can be configured to search for UE-specific control information either in the PDCCH region or in the EPDCCH region, while the PDCCH region is monitored to receive control information common to all users connected to a cell.

Both PDCCH and EPDCCH support unicast transmission of control information for various purposes, including dynamic scheduling assignment in downlink and uplink. In addition, PDCCH supports static multicast transmission of common control information, where a plurality of UEs are statically or semi-statically (i.e., for hundreds of transmission time interval (TTIs)) grouped by the network and assigned, for instance, a common Radio Network Temporary Identifier (RNTI) to decode the control information addressed to the group. As the legacy LTE system schedules UEs to access to orthogonal (hence different) radio resources, dynamic multicast transmission of control information to groups of users created on a TTI-basis is not supported.

SUMMARY

An objective of embodiments of the present invention is to provide a solution which mitigates or solves the drawbacks and problems of conventional solutions.

An "or" in this description and the corresponding claims is to be understood as a mathematical OR which covers "and" and "or", and is not to be understood as an XOR (exclusive OR).

The above objective and further objectives are solved by the subject matter of the independent claims. Further advantageous implementation forms of the present invention can be found in the dependent claims.

According to a first aspect of the invention, the above mentioned and other objectives are achieved with a network node for a wireless communication system, the network node comprising:

a processor configured to:
  generate a check element for each user device in a group of user devices, wherein the check element for the first user device in the group of user devices is based on control information and the identity of the first user device, and wherein the check element for each subsequent user device in the group of user devices is based on the control information, the identity of the subsequent user device and previously generated check elements for previous user devices in the group of user devices,
  form a control information message by appending the check elements for each user device to the control information;
a transmitter configured to:
  transmit the control information message to the group of user devices.

A check element in this disclosure can for example be a Cyclic Redundancy Check (CRC) check word which is also known as CRC code word or simply CRC.

Further, the identity of a user device is also known as user device identity information or user device identifier or user device identity, or user address. An example for such identity can be a Radio Network Temporary Identifier (RNTI) of the user device.

The present network node according to the first aspect provides a number of advantages over conventional solutions. An advantage of the network node according to the first aspect is that the control information common to all user devices in the group does not have to be transmitted multiple times. Thereby, the present solution reduces the control signalling overhead with respect to conventional solutions for transmitting control information to multiple user devices. Compared to conventional solutions, the present solution enables a network node to address control information to a group of user devices formed in a dynamic manner, e.g., on a transmission time interval basis, without requiring the definition and/or utilization of a group user device common address such as, for example, a group-common RNTI.

Further, embodiments of the present network node according to the first aspect provide improved multicasting of downlink control signals to multiple user devices belonging to dynamically allocated user device groups in a way that the control information common to multiple user devices in that group is sent only once and not as many times as the number of said user devices. Thereby, reduced control signalling overhead, with respect to conventional solutions when addressing group of user devices, is achieved with the present network node.

In a first possible implementation form of a network node according to the first aspect, the processor further is configured to form the control information message by appending the check elements for the group of user devices according to the order the check elements for the group of user devices are generated.

The first possible implementation form has the advantage that each user device can detect its own check element immediately after reception of its last bit without waiting to receive the whole control information message. A further advantage is that the receiver can perform check element computation sequentially on the received control information message without knowledge of the number of check elements appended to the control message nor of the position of its own check element in the sequence of appended check elements.

In a second possible implementation form of a network node according to the first possible implementation form of the first aspect or to the first aspect as such, the control information comprises any of common control information for the group of user devices and user device specific control information for at least one user device in the group of user devices.

The second possible implementation form has the advantage that the control information message can be used to transmit (also) user device specific control information, thereby avoiding transmitting additional unicast control messages for each user device with the user device specific control information. Thereby, control signalling overhead can be reduced compared to conventional solutions for transmitting control information to multiple user devices.

In a third possible implementation form of a network node according to the second possible implementation form of the first aspect, the processor further is configured to generate the check element for a subsequent user device based on the identity of the subsequent user device and all control information and check elements in the control information message prior to the check element for the subsequent user device.

The third possible implementation form has the advantage that the check elements are computed on continuous segments of bits in the control message, therefore simple detection algorithms can be used by the user device to detect whether a multicast control message is addressed to the user device or not.

In a fourth possible implementation form of a network node according to the second or third possible implementation forms of the first aspect, the control information comprises user device specific control information for all user devices in the group user devices, and wherein the processor further is configured to form the control information message by sequentially appending the user device specific control information for each user device to the common control information before sequentially appending the check elements for each user device.

The fourth possible implementation form has the advantage that the check elements and the control information are conveniently located in different parts of the control message. Thereby, each user device can detect its own check element immediately after reception of its last bit without waiting to receive the whole control information message. A further advantage is that the user device can perform check element computation sequentially on the received control information message without knowledge of the number of check elements appended to the control message nor of the position of its own check element in the sequence of appended check elements.

In a fifth possible implementation form of a network node according to the fourth possible implementation form of the first aspect, the processor further is configured to generate a check element for each user device, wherein the check element for the first user device is based on the common control information, the user device specific control information for the first user device, and the identity of the first user device, and wherein the check element for each subsequent user device is based on the common control information, the user device specific control information for the subsequent user device and for the previous user devices, the identity of the subsequent user device, and previously generated check elements for the previous user devices.

The fifth possible implementation form has the advantage that the control information common to all user devices in the group does not have to be transmitted multiple times. Thereby, the present solution achieves a reduced signalling overhead with respect to conventional solutions for transmitting control information to multiple user devices.

In a sixth possible implementation form of a network node according to the fifth possible implementation form of the first aspect, the processor further is configured to form the control information message by sequentially appending the check element for each user device interleaved with the associated user device specific control information.

The sixth possible implementation form has the advantage that the user device specific control information for a user device in the control information message is located near the check element for that user device. Therefore, upon detecting its own check element, the receiver is able to extract its own user device specific control information by reading backwards starting from the first bit before its own check element. This implementation form has the additional advantage that upon decoding its own check word, the user device is implicitly made aware of the position of its own user-specific control information without any additional signalling overhead.

In a seventh possible implementation form of a network node according to any of the first to the third possible implementation forms of the first aspect or to the first aspect as such, the user device specific control information indicates user device specific control information for a subgroup of user devices in the group of user devices, and wherein the processor further is configured to generate a check element for each user device, wherein the check element for the first user device is based on the common control information, the user device specific control information for the first user device if the first user device belongs to the subgroup of user devices, and the identity of the first user device, and wherein the check element for each subsequent user device is based on the common control information, the user device specific control information for the subsequent user device if the subsequent user device belongs to the subgroup of user devices and user device specific control information for the previous user devices, the identity of the subsequent user device, and previously generated check elements for the previous user devices.

The seventh possible implementation form has the advantage that a multicast control message can comprise user device specific control information for a sub-group of user devices, thereby reducing the control signalling overhead.

In an eight possible implementation form of a network node according to the seventh possible implementation form of the first aspect, the processor further is configured to form the control information message by sequentially appending the check elements for each user device together with the associated user device specific control information if the user device belongs to the subgroup of user devices.

The eight possible implementation form has the advantage that the user device specific control information for a user device in the control information message is located near the check element for that user device. Therefore, upon detecting its own check element, the user device is able to extract its own user device specific control information by reading backwards starting from the first bit before its own check element.

In a ninth possible implementation form of a network node according to any of the preceding possible implementation forms of the first aspect or to the first aspect as such, the processor further is configured to form the group of user devices based on the radio channel or radio environment properties including one or more of: the signal-to-noise ratio, signal-to-noise and interference ratio, propagation loss, signal-to-leakage and noise ratio, and received signal strength.

However also other criteria, such as estimated distance to the base station, estimated path loss, proportional fair scheduling metrics, expected throughput, latency, etc. can be used for forming the group of user devices.

The ninth possible implementation form has the advantage that user devices intended to receive a multicast control message can be selected based on different criteria, thereby making the solution suitable to support various data transmission and scheduling schemes.

In a tenth possible implementation form of a network node according to any of the preceding possible implementation forms of the first aspect or to the first aspect as such, the transmitter further is configured to transmit the control information message in the same time and frequency radio resource to the group of user devices.

The tenth possible implementation form reduces the time-frequency resources needed for transmitting control information to a group of user devices. The tenth possible implementation form additionally realises an efficient way for multicasting control information to a group of at least two user devices dynamically selected by the network node, such as on a transmission time interval basis.

In an eleventh possible implementation form of a network node according to any of the preceding possible implementation forms of the first aspect or to the first aspect as such, the group of user devices comprises user devices selected to receive multiuser superposition transmission data signals transmitted in a common set or in an overlapping set of time and frequency resources.

The eleventh possible implementation form has the advantage that the signalling overhead for transmitting control information to user devices selected for superposed transmission or reception of data channel is reduced.

According to a second aspect of the invention, the above mentioned and other objectives are achieved with a user device for a wireless communication system, the user device comprising:

a receiver configured to:
receive a control information message addressed for a group of user devices, wherein the control information message comprises control information and a check element for each user device in the group of user devices, and wherein the check element for each user device in the group of user devices are appended to the control information;

a processor configured to:
perform a redundancy check on the control information message based on the identity of the user device, and all control information and check elements in the control information message prior to the check element for the user device;
derive the control information from the control information message and discard check elements of other user devices upon a positive redundancy check.

The user device is configured to communicate in the wireless communication system based on the derived control information.

By receiving the control information message and process the control information message according to the second aspect a number of advantages are provided by the present user device.

An advantage is that all user devices in the group can perform blind check decoding by continuously streaming the control information message. Furthermore, the user device of the second aspect provides a solution for efficiently receiving, detecting, and decoding of multicast downlink control signal addressed to a group of multiple user devices dynamically selected, e.g., on a transmission time interval basis, etc.

In a first possible implementation form of a user device according to the second aspect, the processor further is configured to derive any of common control information for the group of user devices comprised in the control information and user device specific control information for the user device comprised in the control information.

Optionally, the first possible implementation form of the user device also includes discard user device specific control information of other user devices.

The first possible implementation form has the advantage that the user device retrieves the control information from common control information that is multicast to multiple user devices, thereby making efficient use of the transmission resources dedicated to the transmission of control information.

In a second possible implementation form of a user device according to the first possible implementation form of the second aspect, the processor further is configured to derive the user device specific control information for the user device based on the common control information and user device specific control information for at least one other user device in the group of user devices comprised in the control information.

The second possible implementation form has the advantage that the user device retrieves (also) its own user device specific control information from the same control information message that was used to send common control information, thereby avoiding the need to receive additional unicast control messages. In addition, control signalling overhead is effectively reduced by transmitting a multicast control message with user device specific information for only a subgroup of user devices.

According to a third aspect of the invention, the above mentioned and other objectives are achieved with a method for a network node in a wireless communication system, the method comprising
  generating a check element for each user device in a group of user devices, wherein the check element for the first user device in the group of user devices is based on control information and the identity of the first user device, and wherein the check element for each subsequent user device in the group of user devices is based on the control information, the identity of the subsequent user device and previously generated check elements for previous user devices in the group of user devices;
  forming a control information message by appending the check elements for each user device to the control information;
  transmitting the control information message to the group of user devices.

In a first possible implementation form of a method according to the third aspect, the method further comprises
  forming the control information message by appending the check elements for the group of user devices according to the order the check elements for the group of user devices are generated.

In a second possible implementation form of a method according to the first possible implementation form of the third aspect or to the third aspect as such, the control information comprises any of common control information for the group of user devices and user device specific control information for at least one user device in the group of user devices.

In a third possible implementation form of a method according to the second possible implementation form of the third aspect, the method further comprises
  generating the check element for a subsequent user device based on the identity of the subsequent user device and all control information and check elements in the control information message prior to the check element for the subsequent user device.

In a fourth possible implementation form of a method according to the second or third possible implementation forms of the third aspect, the control information comprises user device specific control information for all user devices in the group user devices, and wherein the method further comprises
  forming the control information message by sequentially appending the user device specific control information for each user device to the common control information before sequentially appending the check elements for each user device.

In a fifth possible implementation form of a method according to the fourth possible implementation form of the third aspect, the method further comprises
  generating a check element for each user device, wherein the check element for the first user device is based on the common control information, the user device specific control information for the first user device, and the identity of the first user device, and wherein the check element for each subsequent user device is based on the common control information, the user device specific control information for the subsequent user device and for the previous user devices, the identity of the subsequent user device, and previously generated check elements for the previous user devices.

In a sixth possible implementation form of a method according to the fifth possible implementation form of the third aspect, the method further comprises
  forming the control information message by sequentially appending the check element for each user device interleaved with the associated user device specific control information.

In a seventh possible implementation form of a method according to any of the first to the third possible implementation forms of the third aspect or to the third aspect as such, the user device specific control information indicates user device specific control information for a subgroup of user devices in the group of user devices, and the method further comprises
  generating a check element for each user device, wherein the check element for the first user device is based on the common control information, the user device specific control information for the first user device if the first user device belongs to the subgroup of user devices, and the identity of the first user device, and wherein the check element for each subsequent user device is based on the common control information, the user device specific control information for the subsequent user device if the subsequent user device belongs to the subgroup of user devices and user device specific control information for the previous user devices, the identity of the subsequent user device, and previously generated check elements for the previous user devices.

In an eight possible implementation form of a method according to the seventh possible implementation form of the third aspect, the method further comprises
  forming the control information message by sequentially appending the check elements for each user device together with the associated user device specific control information if the user device belongs to the subgroup of user devices.

In a ninth possible implementation form of a method according to any of the preceding possible implementation forms of the third aspect or to the third aspect as such, the method further comprises
  forming the group of user devices based on the radio channel or radio environment properties including one or more of: the signal-to-noise ratio, signal-to-noise and interference ratio, propagation loss, signal-to-leakage and noise ratio, and received signal strength.

In a tenth possible implementation form of a method according to any of the preceding possible implementation forms of the third aspect or to the third aspect as such, the method further comprises
  transmitting the control information message in the same time and frequency radio resource to the group of user devices.

In an eleventh possible implementation form of a method according to any of the preceding possible implementation forms of the third aspect or to the third aspect as such, the group of user devices comprises user devices selected for superposed transmission or reception in a common set or in overlapping set of time and frequency resources.

According to a fourth aspect of the invention, the above mentioned and other objectives are achieved with a method for a user device in a wireless communication system, the method comprising:

receiving a control information message addressed for a group of user devices, wherein the control information message comprises control information and a check element for each user device in the group of user devices, and wherein the check element for each user device in the group of user devices are appended to the control information;

performing a redundancy check on the control information message based on the identity of the user device, and all control information and check elements in the control information message prior to the check element for the user device;

deriving the control information from the control information message and discarding check elements of other user devices upon a positive redundancy check;

communicating in the wireless communication system based on the derived control information.

In a first possible implementation form of a method according to the fourth aspect, the method further comprises deriving any of common control information for the group of user devices comprised in the control information and user device specific control information for the user device comprised in the control information.

In a second possible implementation form of a method according to the first possible implementation form of the fourth aspect, the method further comprises deriving the user device specific control information for the user device based on the common control information and user device specific control information for at least one other user device in the group of user devices comprised in the control information.

The advantages of the methods according to the third and fourth aspect are the same as those for the network nodes and user device according to the first and second aspects, respectively.

The present invention also relates to a computer program, characterized in code means, which when run by processing means causes said processing means to execute any method according to the present invention. Further, the invention also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the present invention will be apparent from the following detailed description.

BRIEF DESCRIPTION OF THE DRAWINGS

The appended drawings are intended to clarify and explain different embodiments of the present invention, in which.

DETAILED DESCRIPTION

Figure 1:
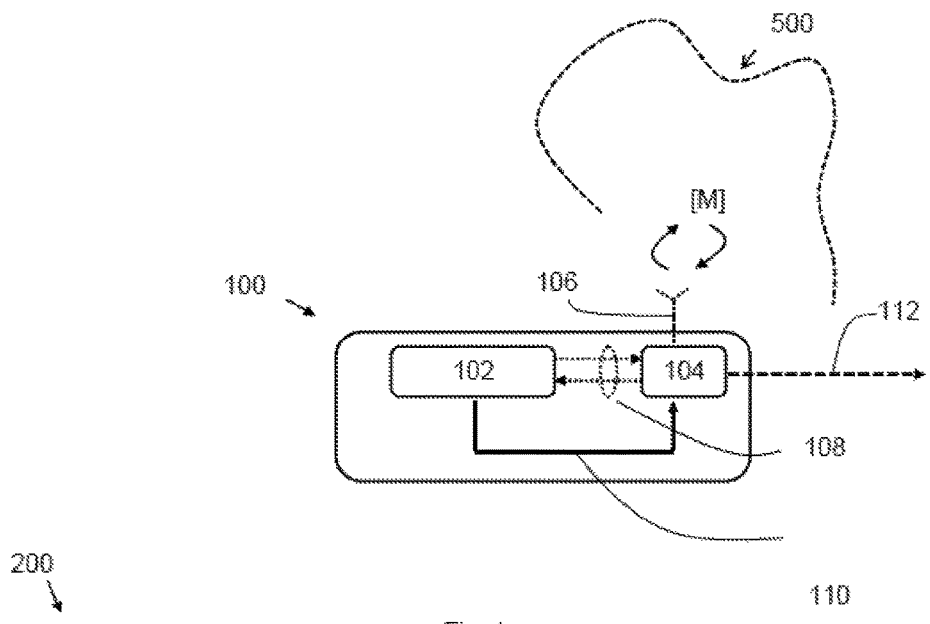
FIG. 1 shows a network node according to an embodiment of the present invention.

Recent advances in radio communications have revived the interest in non-orthogonal multiple access (MA) schemes, where groups of UEs are dynamically scheduled on a TTI-basis to receive (in downlink) or to transmit (in uplink) data streams in the same set of time-frequency resources (i.e., resource blocks (RB), groups of resource blocks (RBG), sub-band) or in partially overlapping sets thereof. Examples of these techniques include Low-Density Spread multiple access (LDS), Constellation Expansion Multiple Access (CEMA) and its version with adaptive rate (RA-CEMA), Semi-Orthogonal Multiple Access (SOMA), the NTT Non-Orthogonal Multiple Access (NOMA) scheme, etc. While these techniques can improve the spectral efficiency of the data channel, adopting unicast transmission of control information may easily saturate the capacity of the control channel due to the increased number of scheduled users per TTI. On the other hand, a large portion of the control information, such as the allocation of radio resources, is common to all UEs in a group of UEs scheduled to receive (in downlink) or to transmit (in uplink) data streams in the same set of time-frequency resources. The portion of control bits reserved in the LTE Downlink Control Information (DCI) formats to the allocation of resource blocks can reach up to 59% of the entire DCI. With the evolution of 5G networks, where larger carrier bandwidths are predicted to reach up to 200 MHz or multiple wideband component carriers are aggregated, the RBs field of the control information will occupy even a more significant portion of the DCI. In NOMA/SOMA/REMA, if the RBs or other common control information can be sent only once to the grouped UEs, the whole control overhead will be significantly reduced. In this context, it has been realised that dynamic multicast transmission of control information, i.e., dynamically addressing through a common DCI or search space UE groups on a TTI basis, can bring significant signalling overhead reduction and enable more advanced data transmission methods.

In LTE radio networks, a DCI is transmitted to UEs in control information message (hereafter also referred to as DCI packet or packet) containing control information data d followed by a Cyclic Redundancy Check (CRC) word c. Such CRC word c is computed as a function of the information bits d and of an identifier $i_z$ of the recipient UE. According to a typical LTE configuration, a W-bit CRC is computed using a W-bit shift-register whose initial content is set to a fixed value. The W-bit CRC word is then bitwise added modulo-2 to the identifier $i_z$ (i.e. the CRC word is scrambled with the identifier) of the addressed UE to obtain $$c_1 = CRC(d; i_1)$$

where $i_1$ is the UE identifier (e.g., the RNTI) of the recipient UE.

If the same control information d has to be sent to a second UE whose identifier is $i_2$, it is not convenient to send a second control information packet containing the same control information d followed by the CRC word $$c'_2 = CRC(d;i_2).$$

It is intended that the aforementioned W-bit CRC word can be computed using a CRC detection mechanism or any other kind of error-detection code.

Instead, embodiments of the present invention propose a new solution for encoding the identities of a group of UEs to whom a multicast control message is addressed in the control message itself. According to the new solution, the identities of all the UEs are accommodated in the control information message by means of individual check elements in a way that each recipient UE, in order to detect the control information message, does not need to refer to any UE group-specific information (e.g., UE-group specific identity or a UE-group check element) nor does it need to know the identities or check elements of the other UEs in the group. The UE identifiers utilized to generate each check element within the multicast control message may consist, for example, of a UE RNTI as defined by the LTE system or a portion of a UE RNTI.

Therefore, embodiments of the present invention relates to a network node and a user device and corresponding methods. In the present disclosure embodiments of the present invention are usually described in a LTE system context. Hence, LTE terminology, system concepts, etc. are used. It should however be understood that the present solution is not limited to such LTE system and can be applied in any suitable wireless communication system. Hence, in the following described embodiments the term user device and UE are both used interchangeable in this disclosure. Further, the present control information message M corresponds to DCI in LTE system. An identity of a user device corresponds to e.g. a RNTI in LTE systems. A check element in the following disclosure corresponds to a Cyclic Redundancy Check (CRC) check word or a CRC code word or simply a CRC.

FIG. 1 shows a network node 100 according to an embodiment of the present invention. The network node 100 comprises a processor 102 which is communicably coupled with communication means 108 to a transmitter 104 in this exemplary embodiment. The communication means 108 are illustrated as dotted arrows between the processor 102 and the transmitter 104 in FIG. 1. The communication means 108 are according to techniques well known in the art. The communication means 108 may e.g. be used for transfer of data or control signalling between the processor 102 and the transmitter 104. The network node 100 in this particular embodiment further comprises control means 110 by which the processor 102 operates (or controls) the transmitter 104. The control means are illustrated with the arrow from the processor 102 to the transmitter 104. The network node 100 also comprises antenna means 106 coupled to the transmitter 104 for transmission in the wireless communication system 500. Optionally, the transmitter 104 may be part of a transceiver for reception and transmissions in the wireless communication system 500, which is illustrated in the embodiment in FIG. 1. The network node 100 may also optionally have wired communication means 112 by which the network node 100 can communicate with other network nodes or other network entities, such as radio network controllers, etc.

Figure 10:
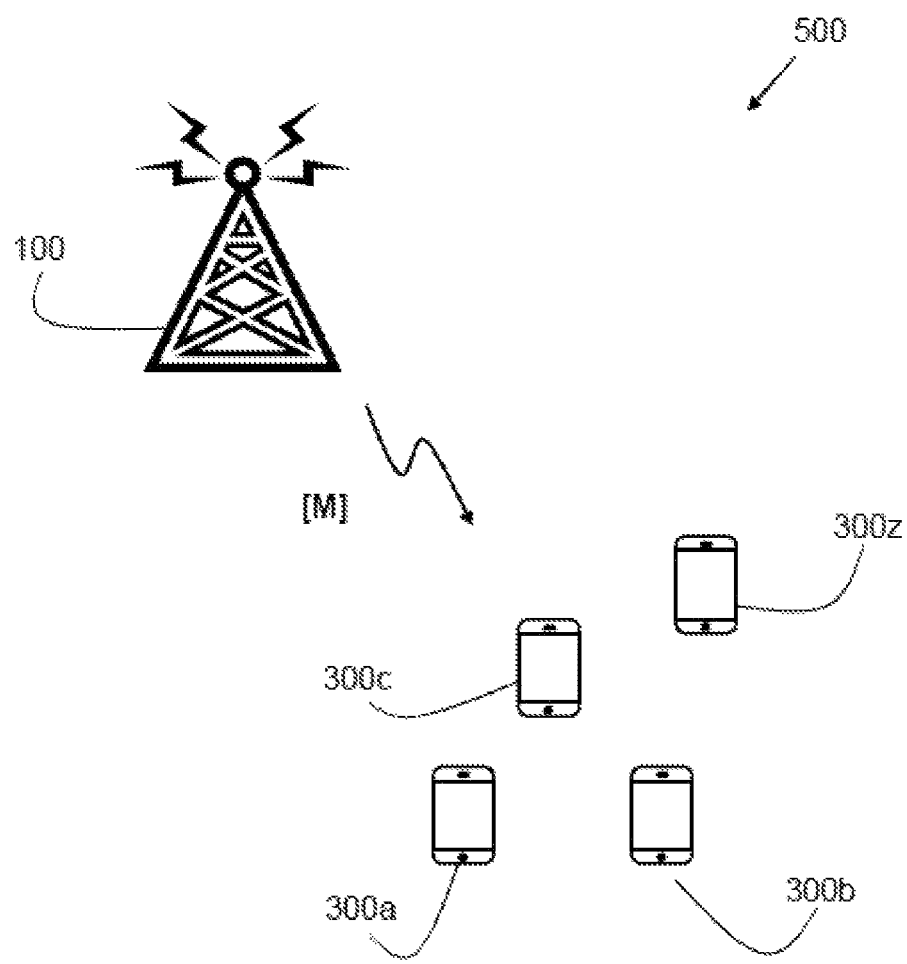
FIG. 10 shows a wireless communication system according to an embodiment of the present invention.

According to the present solution, the processor 102 of the network node 100 is configured to generate a check element (such as a CRC code word) for each user device $300z$ in a group of user devices $300a, \ldots, 300z$ (see FIG. 10). The check element for the first user device $300a$ in the group of user devices $300a, \ldots, 300z$ is based on control information d and the identity of the first user device $i_1$. Further, the check element for each subsequent user device $300z$ in the group of user devices $300a, \ldots, 300z$ is based on the control information d, the identity of the subsequent user device $i_z$ and previously generated check elements for previous user devices in the group of user devices $300a, \ldots, 300z$.

The processor 102 of the network node 100 is further configured to form a control information message M by appending the check elements for each user device $300z$ to the control information d. The control information message M is forwarded to the transmitter 104, and the transmitter 104 of the network node 100 is configured to transmit the control information message M to the group of user devices $300a, \ldots, 300z$ in the wireless communication system 500.

The network node 100 may be a radio network node, an access node or an access point or a base station, e.g. a Radio Base Station (RBS), which in some networks may be referred to as transmitter, "eNB", "eNodeB", "NodeB" or "B node", depending on the technology and terminology used. The radio network nodes may be of different classes such as e.g. macro eNodeB, home eNodeB or pico base station, based on transmission power and thereby also cell size. The radio network node can be a Station (STA), which is any device that contains an IEEE 802.11-conformant Media Access Control (MAC) and Physical Layer (PHY) interface to the Wireless Medium (WM).

Figure 2:
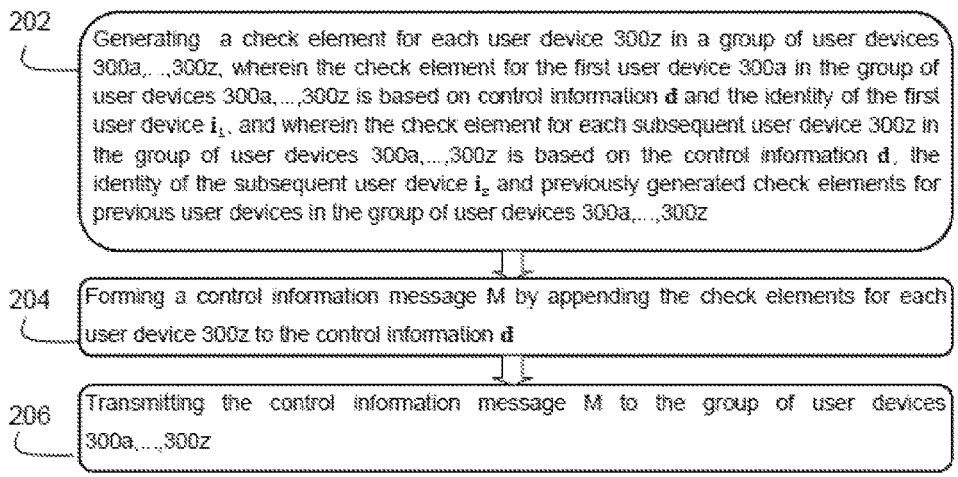
FIG. 2 shows a method according to an embodiment of the present invention.

FIG. 2 shows a corresponding method 200. The method 200 may be executed in a network node 100, such as the one shown in FIG. 1. The method 200 comprises the step 202 of generating a check element for each user device $300z$ in a group of user devices $300a, \ldots, 300z$. The check element for the first user device $300a$ in the group of user devices $300a, \ldots, 300z$ is based on control information d and the identity of the first user device $i_1$. The check element for each subsequent user device $300z$ in the group of user devices $300a, \ldots, 300z$ is based on the control information d, the identity of the subsequent user device $i_z$ and previously generated check elements for previous user devices in the group of user devices $300a, \ldots, 300z$. The method 200 further comprises the step 204 of forming a control information message M by appending the check elements for each user device $300z$ to the control information d. The method 200 finally comprises the step 206 of transmitting the control information message M to the group of user devices $300a, \ldots, 300z$.

Further, the group of user devices $300a, \ldots, 300z$ may be formed based on the radio channel or radio environment properties including one or more of: the signal-to-noise ratio, signal-to-noise and interference ratio, propagation loss, signal-to-leakage and noise ratio, and received signal strength. However also other criteria, such as estimated distance to the base station, estimated path loss, proportional fair scheduling metrics, expected throughput, latency, etc. can be used for forming the group of UEs $300a, \ldots, 300z$.

The group of user devices $300a, \ldots, 300z$ may be formed in a dynamic manner, e.g., on a transmission time interval basis, such it is the case for user devices co-scheduled for multi-user superposed transmission or reception of data channel in the same or partially overlapping radio resources. Example of such transmission schemes include non-orthogonal multiple access and the case of Multiple Input- Multiple Output (MIMO) transmission or reception and Multiuser MIMO (MU-MIMO). The control information message M may therefore comprise common control information to all user devices in the group of user devices $300a, \ldots, 300z$ (e.g., an indication of the allocated time-frequency radio resources) and optionally user device specific control information.

Moreover, in a further embodiment the transmitter 104 of the network node 100 further is configured to transmit the control information message M in the same time and frequency radio resource to the group of user devices $300a, \ldots, 300z$ (i.e. to all user devices in the group of user devices $300a, \ldots, 300z$). According to this embodiment, the control information message M can be regarded as a multicast control information message. In one exemplifying case, the group of user devices $300a, \ldots, 300z$ comprises user devices selected for superposed transmission or reception in a common set or in overlapping set of time and frequency resources. In this case, a large portion of the control information d, such as the allocation of time-frequency radio resources for superposed transmission or reception, is common to all user devices in the group of user devices $300a, \ldots, 300z$. Therefore, by simultaneously signalling the control information d to all user devices with a multicast control information message M, the control signalling overhead is significantly reduced.

Figure 3:
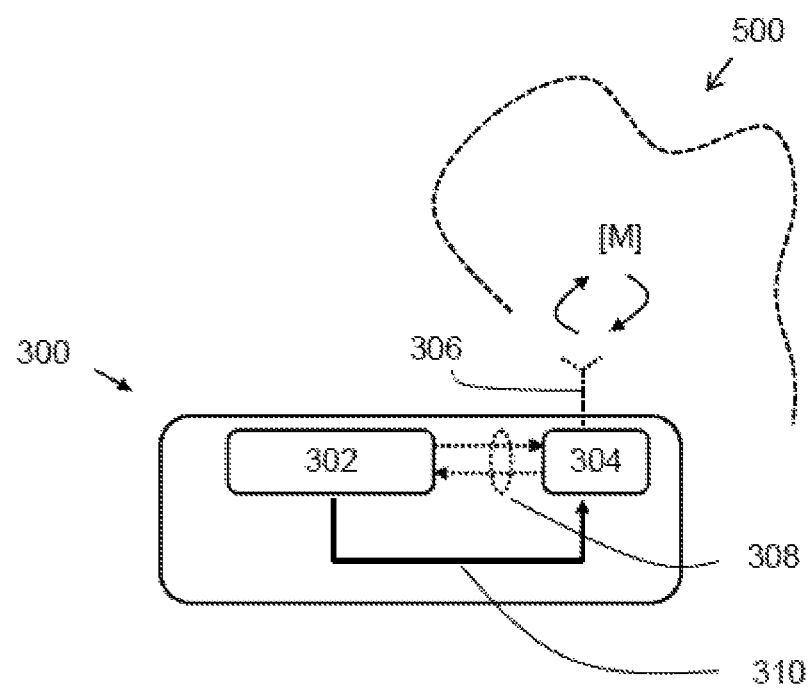
FIG. 3 shows a user device according to an embodiment of the present invention.

FIG. 3 shows a user device 300 according to an embodiment of the present invention. The user device 300 comprises a processor 302 which is communicably coupled with communication means 308 to a receiver 304 in this exemplary embodiment. The communication means 308 are illustrated as dotted arrows between the processor 302 and the receiver 304 in FIG. 1. The communication means 308 are according to techniques well known in the art. The communication means 308 may e.g. be used for transfer of data or control signalling between the processor 302 and the receiver 304. The user device 300 in this particular embodiment further comprises control means 310 by which the processor 302 operates (or controls) the receiver 304. The control means are illustrated with the arrow from the processor 302 to the receiver 304. The user device 300 also comprises antenna means 306 coupled to the receiver 304 for reception in the wireless communication system 500. Optionally, the receiver 304 may be part of a transceiver for reception and transmissions in the wireless communication system 500, which is illustrated in the embodiment in FIG. 3.

According to the present solution, the receiver 304 of the user device 300 is configured to receive a control information message M addressed for a group of user devices $300a, \ldots, 300z$. The control information message M comprises, as mentioned before, control information d and a check element for each user device $300z$ in the group of user devices $300a, \ldots, 300z$ to which the control information message M is addressed to. The check elements for each user device $300z$ in the group of user devices $300a, \ldots, 300z$ are appended to the control information d. The control information message M is forwarded to the processor 302 of the user device 300.

The processor 302 of the user device 300 is configured to perform check element detection by computing a redundancy check on the control information message M. The processor 302 of the user device 300 sequentially processes the bits of the control message M by starting from the leftmost bit of the control information $d=(d_1, \ldots, d_N)$. Each bit $d_i$ is fed into a CRC check device (not shown), which computes a W-bit test check element as a function of the current and previous bits in the control information and of the identity $i_z$ of the user device 300. When the test check element computed by the processor 302 coincides with the W bits in the received control message following the position of the last bit used by the processor 302 to compute the test check element, a check element is detected in the received control message, a check pass is declared and the check element detection procedure is terminated. Otherwise, the following bit $(d_{i+1})$ is fed into the CRC check device and a new test check element is computed. The check element detection procedure terminates either when a check element is detected in the received control message M or when the number of remaining bits in the control message is less than W.

The processor 302 of the user device 300 is further configured to derive the control information d from the control information message M and discard check elements of other user devices upon a positive redundancy check. The processor 302 of the user device 300 is further configured to communicate in the wireless communication system 500 based on the derived control information d.

Figure 4:
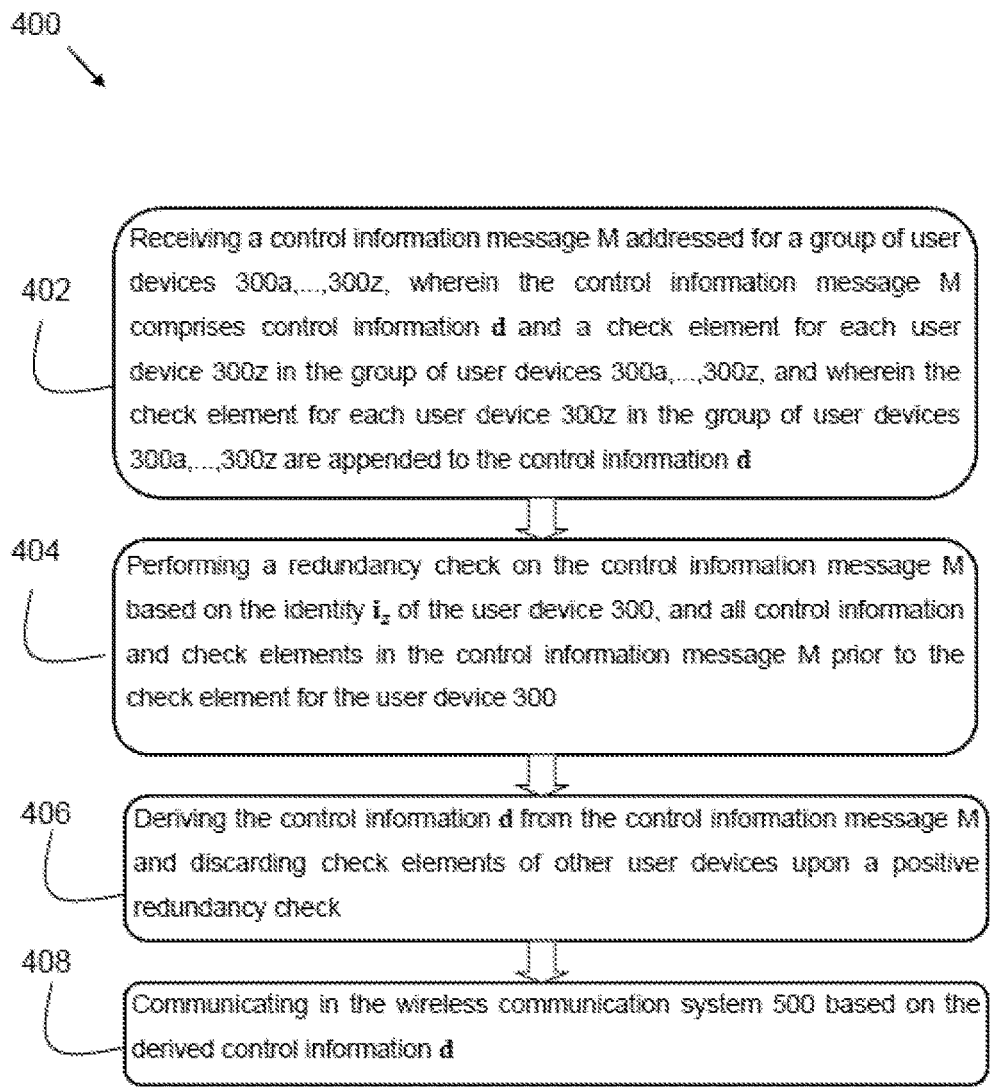
FIG. 4 shows a method according to an embodiment of the present invention.

FIG. 4 shows a corresponding method 400. The method 400 may be executed in a user device 300, such as the one shown in FIG. 3. The method 400 comprises the step 402 of receiving a control information message M addressed for a group of user devices $300a, \ldots, 300z$. The control information message M comprises control information d and a check element for each user device $300z$ in the group of user devices $300a, \ldots, 300z$, and the check element for each user device $300z$ in the group of user devices $300a, \ldots, 300z$ are appended to the control information d. The method 400 further comprises the step 404 of performing a redundancy check on the control information message M based on the identity $i_z$ of the user device 300, and all control information and check elements in the control information message M prior to the check element for the user device 300. The method 400 further comprises the step 406 of deriving the control information d from the control information message M and discarding check elements of other user devices upon a positive redundancy check. The method 400 finally comprises the step 408 of communicating in the wireless communication system 500 based on the derived control information d.

The CRC check procedure can be performed according to the following example. The CRC device (not shown) of the user device 300 has an internal state variable of W bits (W is equal to the number of bits of the CRC word), which is initialized to all zeros at the beginning of each CRC check operation. The CRC check device sequentially processes the bits of a DCI packet comprising the control information message M by starting from the leftmost bit of the control information $d=(d_1, \ldots, d_N)$ until a certain termination condition is encountered. Each bit $d^i$ is fed into the CRC check device, which computes a new W-bit CRC state as a function of the previous CRC state and of the input bit $d_i$. The new CRC state is then scrambled using the identity of the user device 300 (e.g. RNTI) and compared with the W bits following (i.e., $d_{i+1}, \ldots, d_{i+W}$) in the received control message M. Upon success of this comparison, the CRC check is declared and the CRC check operation terminated. Otherwise, the following bit $(d_{i+1})$ is fed into the CRC check device. The procedure is repeated until a CRC check condition is reached or until a maximum number of bits have been fed into the CRC check device.

In an embodiment of the user device 300, the processor 302 further is configured to derive any of common control information $d_c$ for the group of user devices $300a, \ldots, 300z$ comprised in the control information d and user device specific control information $d_z$ for the user device 300 comprised in the control information d. This means that the control information d may comprise only common control information $d_c$ or only user device specific control information $d_z$ or both common control information $d_c$ and user device specific control information $d_z$.

According to an embodiment, the processor 302 further is configured to derive the user device specific control information $d_z$ for the user device 300 based on the common control information $d_c$ and user device specific control information $d_z$ for at least one other user device in the group of user devices 300a, . . . , 300z comprised in the control information d. In one exemplifying case, the control message M can be addressed to two user devices (300a, 300b) selected to receive (or transmit) data channel information in a common set of time-frequency resources via multiuser superposed transmission, wherein the total transmit power P used to transmit in the common set of time-frequency resources is split as $P=P_a+P_b$, with $P_a$ and $P_b$ being the transmit power used for the data channel of user devices 300a and 300b, respectively. User devices 300a and 300b need to know the allocated powers $P_a$ and $P_b$ in order to be able to decode their data channel information. To reduce the signalling overhead, the control message M may be formed to comprise only the user device specific control information $P_a$ (or equivalently $P_b$), whilst $P_b$ (or equivalently $P_a$) can be derived by user device 300b (or equivalently 300a) according to this embodiment as $P_b=P-P_a$ (or equivalently $P_a=P-P_b$).

In an embodiment of the present invention, the present user device 300 may be any of a User Equipment (UE), mobile station (MS), wireless terminal or mobile terminal being enabled to communicate wirelessly in a wireless communication system, sometimes also referred to as a cellular radio system. The UE may further be referred to as mobile telephones, cellular telephones, computer tablets or laptops with wireless capability. The UEs in the present context may be, for example, portable, pocket-storable, hand-held, computer-comprised, or vehicle-mounted mobile devices, enabled to communicate voice or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM).

Moreover, according to an embodiment of the present invention, the processor 102 of the network node 100 further is configured to form the control information message M by appending the check elements for the group of user devices 300a, . . . , 300z according to the order the check elements for the group of user devices 300a, . . . , 300z are generated.

According to an embodiment of the present invention, the processor 102 is configured to generate the check element for a subsequent user device 300z based on the identity $i_z$ of the subsequent user device 300z and all control information and check elements in the control information message M prior to the check element for the subsequent user device 300z.

Therefore, a second check element (e.g. CRC word) is appended to the first control information message (e.g. a DCI packet) [d, $c_1$], and the second check element (e.g. CRC word) is computed as $$c_2=CRC(d,c_1;i_2)$$

such that the transmitted control message M is [d, $c_1$, $c_2$].

Figure 5:
FIG. 5 shows a format of a multicast control message according to an embodiment of the present invention.

If more than two user devices have to be addressed, this encoding process is iterated, obtaining a control message M with multiple check element fields as shown in FIG. 5.

Generally, the $z^{th}$ check element for the $z^{th}$ user device 300z is computed as $$c_z=CRC(d,c_1,\ldots,c_{z-1};i_z)$$

where $i_z$ is the user device identifier of the $z^{th}$ user device.

The first user device 300 will successfully detect the control message M after the last bit of $c_1$ has been processed, and then it will read d. In order to reduce the blind decoding attempts that have to be performed, the user device 300 may skip the W(Z−1) bits following $c_1$ before starting to process the next control message. To this purpose, it may be convenient to add a field in the control message M containing the number of user devices the current control message M is addressed to in the control message's M data field d.

Therefore, according to an embodiment of the present invention, information about the number of user devices is comprised in the control information message M. Hence, the network node 100 can be configured to include such information in the control information message.

The second user device will blindly detect the control message M after the last bit of $c_2$ has been processed, and then it will read d, discard $c_1$ and possibly skip the W(Z−2) bits following $c_2$. As for the other user devices, the same blind detection algorithm as for the second user device can be employed.

As a result of this and the following embodiments, the same downlink control information is multicast to the user devices corresponding to different identities (RNTIs) $i_1$ to $i_z$. This can be efficiently achieved by configuring the transmitter at the network node 100 to transmit the control information message M in the same time and frequency radio resource to (each user device of) the group of user devices 300a, . . . , 300z, such as the radio resource of a control channel (e.g., the PDCCH or EPDCCH in the LTE system).

Figure 6:
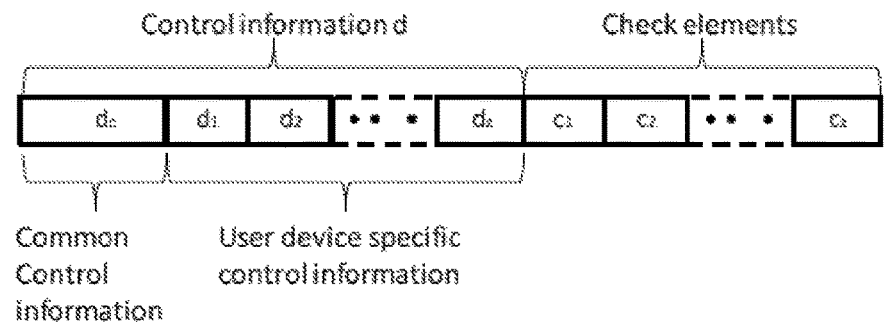
FIG. 6 shows a format of a multicast control message according to a further embodiment of the present invention.
Figure 7:
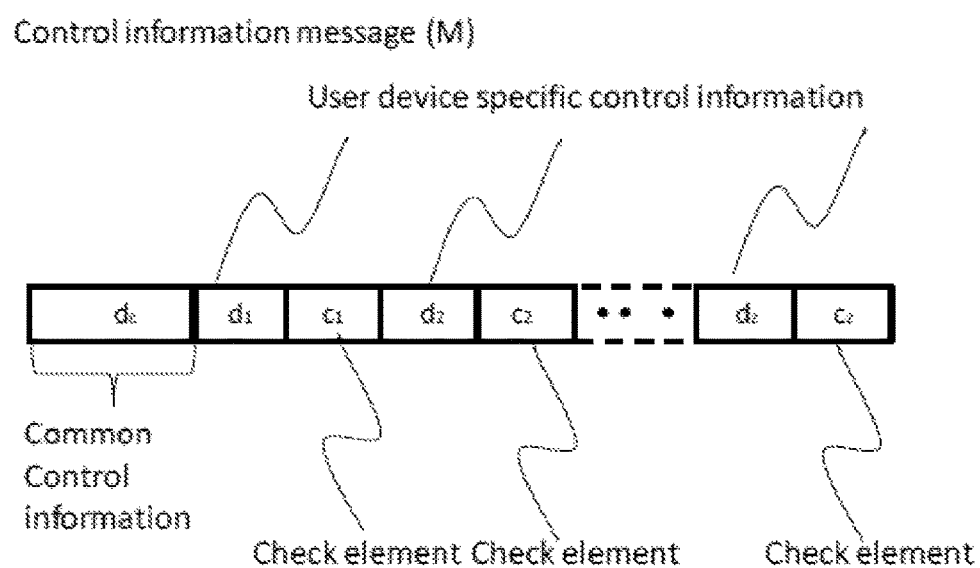
FIG. 7 shows a format of a multicast control message according to a further embodiment of the present invention.

In a further embodiment of the present invention, the control information d comprises the common control information $d_c$ and user specific control information $d_1$, . . . , $d_Z$, respectively for totally Z users, as shown in FIGS. 6 and 7.

Within the total length of N+(P+W)×Z bits, if the length of $d_c$ and allocation of each specific user device control information allocation is known to the corresponding user device, the $z^{th}$ check element $c_z$ is computed as $$c_z=CRC(d_c,d_1,c_1,\ldots,d_{z-1},c_{z-1},d_z;i_z)$$

where $i_z$ is the identity of the $z^{th}$ user device, such as an RNTI of the LTE system. The blind detection can be correspondingly attempted by taking the corresponding $d_c$, $d_z$, and $c_z$ in the received total N+(P+W)×Z bits, wherein N is the number of bits of the common control information $d_c$, P is the number of bits of a user specific control information $d_z$, and W is the number of bits of a CRC word $c_z$.

In one embodiment as shown in FIG. 6, the user device specific control information $d_z$ for all user devices in the group 300a, . . . , 300z are sequentially appended to the common control information $d_c$. The check elements for all user devices in the group are sequentially appended to the user device specific control information $d_z$. Therefore, the processor 102 of the network node 100 is configured to form the control information message M by sequentially appending the user device specific control information $d_z$ for each user device 300z to the common control information $d_c$ before sequentially appending the check elements for each user device 300z.

In one embodiment as shown in FIG. 7, the user device specific control information $d_z$ for one user device 300z is placed immediately before the check element for the same user device 300z. The user device specific control information $d_z$ and user device 300 check element pair for each user device is appended to the common control information $d_c$. Therefore, the processor 102 of the network node 100 further is configured to form the control information message M by sequentially appending the check element for each user device 300z interleaved with the associated user device specific control information $d_z$.

Therefore, upon a positive redundancy check, the user device 300 knows that it can read the common control information starting from the beginning of the control message M for a length of N bits and its own user-specific control information reading backwards starting from the first bit preceding its own CRC word for a length of P bits.

In a further embodiment of the invention, the control information d comprises of the common control information $d_c$ and user specific control information $d_z$ for at least one user device 300z in the group of user devices 300a, . . . , 300z. This is shown in FIGS. 8 and 9 in which K number of user devices in the group of user devices 300a, . . . , 300z, where K<Z, have user specific control information $d_z$.

Figure 8:
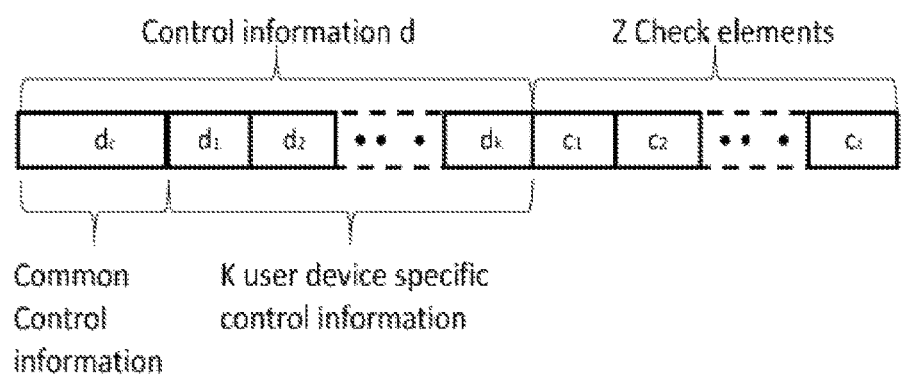
FIG. 8 shows a format of a multicast control message according to a further embodiment of the present invention.

In the embodiment in FIG. 8 the control information message M starts with common control information $d_c$ followed by user specific control information $d_k$ for the K number of user devices sequentially appended. Finally, the check elements for the Z number of user devices are sequentially appended to the user specific control information $d_k$ for the K number of user devices. Therefore, the processor 102 of the network node 100 according to this embodiment is further configured to generate a check element for each user device 300z. The check element for the first user device 300a is based on the common control information $d_c$, the user device specific control information $d_1$ for the first user device if the first user device $i_1$ belongs to the subgroup of user devices, and the identity of the first user device. The check element for each subsequent user device 300z after the first user device is based on the common control information $d_c$, the user device specific control information $d_z$ for the subsequent user device if the subsequent user device 300z belongs to the subgroup of user devices and user device specific control information $d_z$ for the previous user devices, the identity of the subsequent user device, and previously generated check elements for the previous user devices. In other words this embodiment enables that only to a subgroup (K user devices) of the group of user devices (comprising Z user devices) to which the control information message M is addressed user device specific control information is provided.

Figure 9:
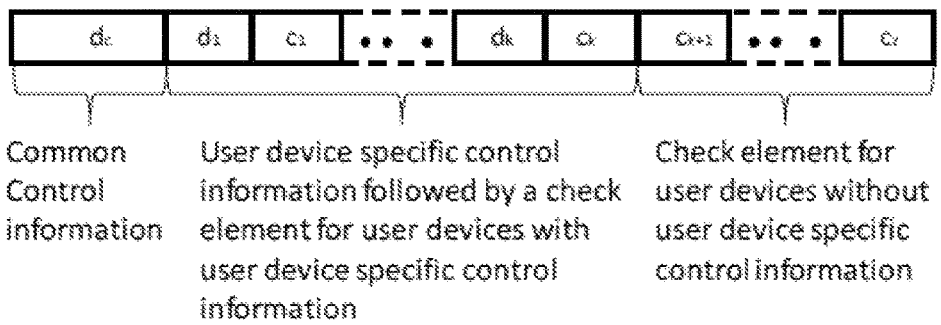
FIG. 9 shows a format of a multicast control message according to a further embodiment of the present invention.

In the embodiment in FIG. 9 control information message M starts with common control information $d_c$ followed by user specific control information $d_k$ and check element pairs for each user device among the K number of user devices. Mentioned pairs are sequentially appended. Finally, the check elements $c_{k+1} \ldots c_z$ for user devices without user specific control information $d_k$ are sequentially appended in the control information message M. Therefore, the processor 102 of the network node 100 according to this embodiment further is configured to form the control information message M by sequentially appending the check elements for each user device 300z together with the associated user device specific control information $d_{zk}$ if the user device belongs to the subgroup of user devices.

FIG. 10 illustrates a wireless communication system 500 according to an embodiment of the present invention. A network node 100 serves a group of user devices 300a, . . . , 300z. According to the present solution a control information message M is transmitted from the network node 100 to the group of user devices 300a, . . . , 300z. The control information message M may have any format according to embodiments of the present invention. The group of user devices 300a, . . . , 300z receive the control information message M, and perform a CRC check of the control information message M. Upon successful CRC check, the group of user devices 300a, . . . , 300z communicate in the wireless communication system 500 according to the control information d in the control information message M.

Furthermore, any method according to the present invention may be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the present receiver device comprises the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processors of the present receiver device comprises, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the present invention is not limited to the embodiments described above, but also relates to and incorporates all embodiments within the scope of the appended independent claims.

What is claimed is:

1. A network node for a wireless communication system, the network node comprising:
   a processor configured to:
      generate a check element for each user device in a group of user devices, wherein a check element for a first user device in the group of user devices is based on control information and an identity of the first user device, and wherein the check element for each subsequent user device in the group of user devices is based on the control information, an identity of the subsequent user device and previously generated check elements for previous user devices in the group of user devices, form a control information message by appending the previously generated check elements for each user device to the control information;

a transmitter configured to:

transmit the control information message to the group of user devices.

2. The network node according to claim 1, wherein the processor further is configured to:

form the control information message by appending the previously generated check elements for the group of user devices according to an order the previously generated check elements for the group of user devices are generated.

3. The network node according to claim 1, wherein the control information comprises any of common control information for the group of user devices and user device specific control information for at least one user device in the group of user devices.

4. The network node according to claim 3, wherein the processor further is configured to:

generate the check element for a subsequent user device based on the identity of the subsequent user device and all control information and check elements in the control information message prior to the check element for the subsequent user device.

5. The network node according to claim 3, wherein the control information comprises user device specific control information for all user devices in the group user devices, and wherein the processor further is configured to:

form the control information message by sequentially appending the user device specific control information for each user device to the common control information before sequentially appending the check elements for each user device.

6. The network node according to claim 5, wherein the processor further is configured to generate a check element for each user device, wherein the check element for the first user device is based on the common control information the user device specific control information for the first user device, and the identity of the first user device, and wherein the check element for each subsequent user device is based on the common control information, the user device specific control information for the subsequent user device and for the previous user devices, the identity of the subsequent user device and the previously generated check elements for the previous user devices.

7. The network node according to claim 6, wherein the processor further is configured to:

form the control information message by sequentially appending the check element for each user device interleaved with the associated user device specific control information.

8. The network node according to claim 1, wherein the user device specific control information comprises user device specific control information for a subgroup of user devices in the group of user devices, and wherein the processor further is configured to:

generate a check element for each user device, wherein the check element for the first user device is based on the common control information, the user device specific control information for the first user device when the first user device belongs to the subgroup of user devices, and the identity of the first user device, and wherein the check element for each subsequent user device is based on the common control information, the user device specific control information for the subsequent user device when the subsequent user device belongs to the subgroup of user devices and user device specific control information for the previous user devices, the identity of the subsequent user device, and previously generated check elements for the previous user devices.

9. The network node according to claim 8, wherein the processor further is configured to form the control information message by sequentially appending the check elements for each user device together with the associated user device specific control information when the user device belongs to the subgroup of user devices.

10. The network node according to claim 1, wherein the processor further is configured to form the group of user devices based on the radio channel or radio environment properties including one or more of: a signal-to-noise ratio, a signal-to-noise and interference ratio, propagation loss, a signal-to-leakage and noise ratio, and a received signal strength.

11. A user device for a wireless communication system, the user device comprising:

a receiver configured to:

receive a control information message addressed for a group of user devices, wherein the control information message comprises control information and a check element for each user device in the group of user devices, and wherein the check element for each user device in the group of user devices are appended to the control information; and a processor configured to:

perform a redundancy check on the control information message based on the identity of the user device, and all control information and check elements in the control information message prior to the check element for the user device;

derive the control information from the control information message and discard check elements of other user devices upon a positive redundancy check; and wherein the user device is configured to communicate in the wireless communication system based on the control information derived from the control information message.

12. The user device according to claim 11, wherein the processor is further configured to:

derive any of the following information comprised in the control information: (a) common control information for the group of user devices and (b) user device specific control information for the user device.

13. The user device according to claim 12, wherein the processor is further configured to derive the user device specific control information for the user device based on the common control information and derive user device specific control information for at least one other user device in the group of user devices comprised in the control information.

14. A method for a network node in a wireless communication system, the method comprising;

generating a check element for each user device in a group of user devices, wherein a check element for a first user device in the group of user devices is based on control information and an identity of the first user device, and wherein the check element for each subsequent user device in the group of user devices is based on the control information, an identity of the subsequent user device and previously generated check elements for previous user devices in the group of user devices;

forming a control information message by appending the previously generated check elements for each user device to the control information; and transmitting the control information message to the group of user devices.

15. A non-transitory computer readable medium, comprising processor-executable instructions which when executed by a processor cause the processor to implement the method according to claim 14.

16. The method according to claim 14, further comprising:

forming the control information message by appending the previously generated check elements for the group of user devices according to an order the previously generated check elements for the group of user devices are generated.

17. A method for a user device in a wireless communication system, the method comprising:

receiving a control information message addressed for a group of user devices, wherein the control information message comprises control information and a check element for each user device in the group of user devices, and wherein the check element for each user device in the group of user devices are appended to the control information;

performing a redundancy check on the control information message based on an identity of the user device, and all control information and check elements in the control information message prior to the check element for the user device;

deriving the control information from the control information message and discarding check elements of other user devices upon a positive redundancy check; and communicating in the wireless communication system based on the control information derived from the control information message.

18. A non-transitory computer readable medium, comprising processor-executable instructions which when executed by a processor cause the processor to implement the method according to claim 17.

19. The method according to claim 17, further comprising:

deriving any of the following information comprised in the control information: (a) common control information for the group of user devices and (b) user device specific control information for the user device.

* * * * *